(12) United States Patent
Lambrecht et al.

(10) Patent No.: US 12,027,991 B2
(45) Date of Patent: Jul. 2, 2024

(54) RECTIFIER AND POWER SUPPLY DEVICE

(71) Applicant: Siemens Aktiengesellschaft, Munich (DE)

(72) Inventors: Franziska Lambrecht, Rückersdorf (DE); Markus Schwarz, Munich (DE); Harald Schweigert, Vienna (AT); Jörg Zapf, Munich (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 1 day.

(21) Appl. No.: 18/003,559

(22) PCT Filed: May 14, 2021

(86) PCT No.: PCT/EP2021/062811
§ 371 (c)(1),
(2) Date: Dec. 28, 2022

(87) PCT Pub. No.: WO2022/002473
PCT Pub. Date: Jan. 6, 2022

(65) Prior Publication Data
US 2023/0238894 A1    Jul. 27, 2023

(30) Foreign Application Priority Data

Jun. 29, 2020 (DE) .................... 10 2020 208 058.5
Aug. 31, 2020 (EP) .................... 20193518

(51) Int. Cl.
*H02M 7/32* (2006.01)
*H02M 1/42* (2007.01)
*H02M 7/219* (2006.01)

(52) U.S. Cl.
CPC ............... *H02M 7/32* (2013.01); *H02M 1/42* (2013.01); *H02M 7/219* (2013.01)

(58) Field of Classification Search
CPC .................. H02M 7/32; H02M 7/219
See application file for complete search history.

(56) References Cited

U.S. PATENT DOCUMENTS

2012/0169266 A1* 7/2012 Anand .................. H02P 7/066
                                                            318/519
2012/0268974 A1  10/2012 Fattal .............................. 363/81
(Continued)

FOREIGN PATENT DOCUMENTS

DE   10 2017 215 236    2/2019    ............... B81B 7/02
JP         2017123329 A    7/2017    ............. H01L 33/00
(Continued)

OTHER PUBLICATIONS

Search Report for International Application No. PCT/EP2021/062811, 12 pages, dated Jul. 2, 2021.
(Continued)

*Primary Examiner* — Gary A Nash
(74) *Attorney, Agent, or Firm* — Slayden Grubert Beard PLLC

(57) ABSTRACT

Various embodiments of the teachings herein include a rectifier. The rectifier may include: a rectifier circuit formed with current valves with microelectromechanical systems (MEMS) switches; and a switching controller driving the MEMS switches to switch and open. The switching controller opens the MEMS switches when a voltage feeding the rectifier falls below a minimum distance from a zero voltage.

10 Claims, 4 Drawing Sheets

(56) References Cited

U.S. PATENT DOCUMENTS

| | | | | |
|---|---|---|---|---|
| 2013/0154492 | A1* | 6/2013 | Summerland | H02M 7/219 363/126 |
| 2017/0047841 | A1* | 2/2017 | Zojer | H01L 27/0629 |
| 2017/0148592 | A1 | 5/2017 | Tabib-azir et al. | 200/5 A |
| 2017/0196071 | A1 | 7/2017 | Gim | |
| 2018/0248353 | A1 | 8/2018 | Creech | H02H 3/08 |
| 2019/0006954 | A1* | 1/2019 | Hwang | H02M 7/219 |
| 2019/0068077 | A1* | 2/2019 | Ueta | H02M 1/08 |

FOREIGN PATENT DOCUMENTS

| | | | | |
|---|---|---|---|---|
| JP | 2019126217 A | 7/2019 | | H02M 7/12 |
| KR | 2012 0074556 | 7/2012 | | H02N 2/00 |

OTHER PUBLICATIONS

Search Report for EP Application No. 20193518.6, 7 pages, dated Feb. 11, 2021.

Kasargod, P. S. et al; "A MEMS based rectifier for energy harvesting"; European Conference on Circuit Theory and Design (ECCTD); IEEE; pp. 1-4, 2017.

Kim, Chong-Eun et al: "High-Efficiency Two-Inductor PFC Boost Converter Employing SPOT Relay"; IEEE Transactions on Power Electronics; Institute of Electrical and Electronics Engineers; vol. 30; No. 6; pp. 2901-2904, 2015.

Electronics Fundamentals/Diode Circuit; https://en.wikibooks.org/wiki/Electronics_Fundamentals/Diode_Circuit, Jul. 2, 2020.

Gomez-Casseres E., Andres et al: "Comparison of passive rectifier circuits for energy harvesting applications"; IEEE Canadian Conference on Electrical and Computer Engineering (CCECE); pp. 1-6, 2016.

Japanese Notice of Allowance, Application No. 2022578750, 5 pages, dated Jan. 23, 2024.

\* cited by examiner

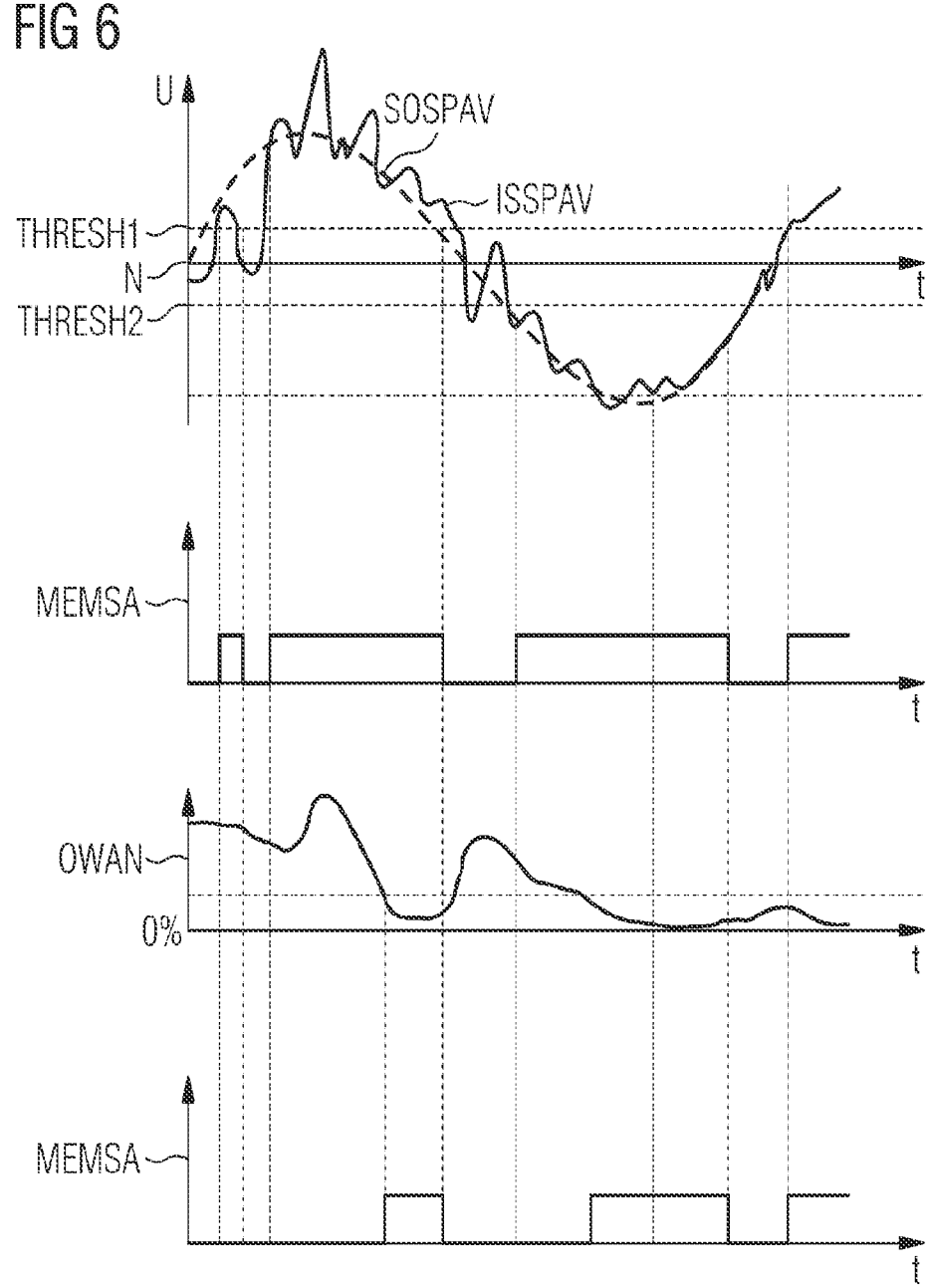

RECTIFIER AND POWER SUPPLY DEVICE

CROSS-REFERENCE TO RELATED APPLICATIONS

This application is a U.S. National Stage Application of International Application No. PCT/EP2021/062811 filed May 14, 2021, which designates the U.S. of America, and claims priority to EP Application No. 20193518.6 filed Aug. 31, 2020, and DE Application No. 10 2020 208 058.5 filed on Jun. 29, 2020, the contents of which are hereby incorporated by reference in their entirety.

TECHNICAL FIELD

The present disclosure relates to power supplies. Various embodiments of the teachings herein include rectifiers, power supply devices, and/or systems.

BACKGROUND

Electrical energy is generally supplied as AC voltage. However, electronic terminal devices such as computers or smartphones or numerous automation technology components regularly require a—mostly low—DC voltage due to the intensive use of semiconductor elements. Such semiconductor elements usually require a clear voltage situation for operation and thus a DC voltage. Additionally, a very large number of electronic devices also require galvanic isolation in order to convert the mains voltage to a safe DC voltage, frequently in the 5 V to 30 V range. Clocked power supplies, which are also simply called power supply units, are usually used for this purpose.

Diode rectifiers are used for rectifying AC voltages; in combination with a downstream converter—the latter usually with electrical isolation—these typically have efficiencies of between 80% and 90%. Resonant converters are usually used to achieve efficiencies of up to 95%; rectifier diodes on the output side of these are replaced by substantially more efficient low-voltage MOSFETs. However, for universal use with variable input voltages, a DC-link voltage must be pre-regulated in the case of resonant converters.

Such pre-regulation is typically implemented by means of an active power factor correction (active PFC), which additionally provides an almost sinusoidal current profile, further increasing efficiency and thus minimizing the load on mains supply lines. However, such pre-regulation using an active power factor correction also comes up against efficiency limits.

Furthermore, bridgeless rectifier topologies with a power factor correction are known. Firstly, however, such rectifier topologies require a larger installation space. Secondly, they are expensive.

In principle, diodes can be replaced by transistors, for example MOSFETs. However, connecting many transistors in parallel is expensive and transistors are generally not sufficiently surge-proof and frequently do not have a sufficiently small voltage drop.

SUMMARY

The teachings of the present disclosure may provide an improved rectifier, an improved power supply device, and/or an improved system. In particular, the rectifier, power supply device and system should be operable with greater energy efficiency. For example, some embodiments include a rectifier having a rectifier circuit formed with current valves, in which the current valves are formed with MEMS switches ($S_1$, $S_2$, $S_3$, $S_4$), and having a switching controller (60), the switching controller (60) being designed to drive the MEMS switches ($S_1$, $S_2$, $S_3$, $S_4$) to switch and open, the switching controller (60) being designed to open the MEMS switches ($S_1$, $S_2$, $S_3$, $S_4$) when a voltage (80) feeding the rectifier (50), in particular an AC voltage, falls below a minimum distance (THRESH1, THRESH2) from a zero voltage (N).

In some embodiments, the rectifier circuit is or comprises a bridge circuit or the rectifier circuit comprises a bridgeless PFC circuit.

In some embodiments, the bridge circuit is or comprises a Graetz circuit.

In some embodiments, the MEMS switches ($S_1$, $S_2$, $S_3$, $S_4$) are driven to switch or open.

In some embodiments, the rectifier circuit comprises diodes ($D_1$, $D_2$, $D_3$, $D_4$) connected in parallel with the MEMS switches ($S_1$, $S_2$, $S_3$, $S_4$).

In some embodiments, the diodes ($D_1$, $D_2$, $D_3$, $D_4$) are oriented and connected in such a way that the diodes ($D_1$, $D_2$, $D_3$, $D_4$) form a rectifier circuit, preferably a bridge circuit and in particular a Graetz circuit, with other parts of the rectifier when the MEMS switches ($S_1$, $S_2$, $S_3$, $S_4$) are open.

In some embodiments, the voltage (80) feeding the rectifier (50) is an AC voltage.

In some embodiments, the switching controller (60) is designed to open the MEMS switches ($S_1$, $S_2$, $S_3$, $S_4$) when a voltage (80) feeding the rectifier (50), in particular an AC voltage, exceeds a threshold value for a harmonic component (OWAN).

As another example, some embodiments include a power supply device having a rectifier (50) as described herein.

As another example, some embodiments include a system having a terminal device and having a power supply device as described herein, wherein the terminal device (20) is connectable to the power supply device (30) in order to supply power to the terminal device (20).

BRIEF DESCRIPTION OF THE DRAWINGS

The teachings of the present disclosure are explained in more detail below with the aid of an exemplary embodiment illustrated in the drawing, in which:

FIG. 6 schematically shows a control method for controlling the rectifiers according to FIGS. 2 and 3 and FIGS. 4 and 5 in a schematic sketch.

DETAILED DESCRIPTION

Figure 1:
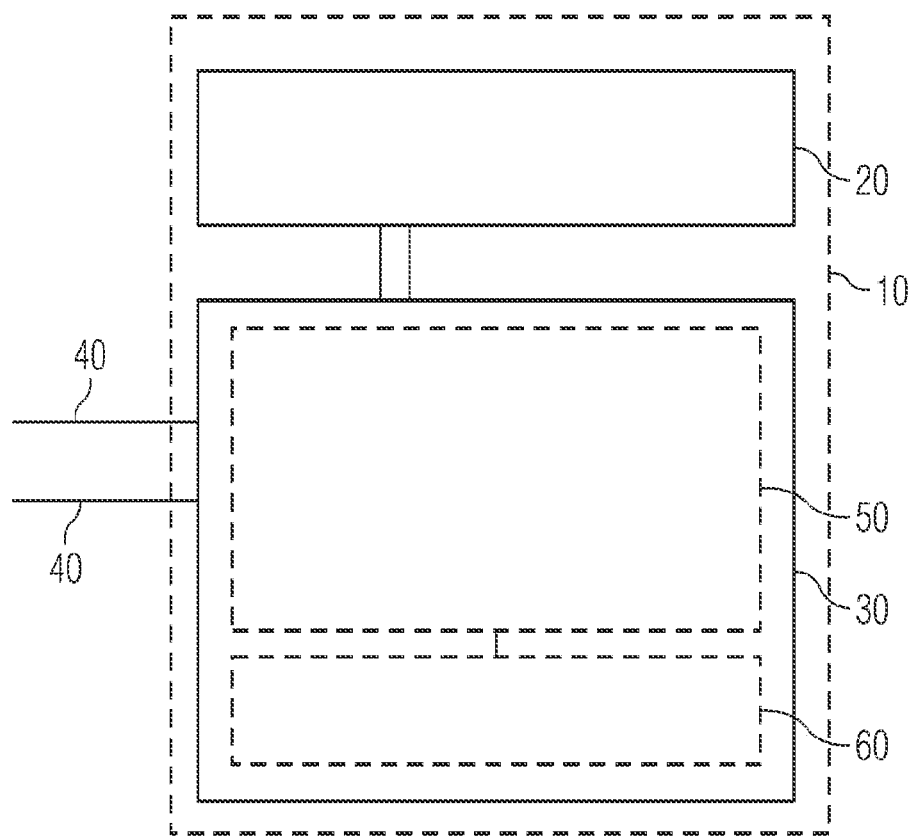
FIG. 1 schematically shows a system with a power supply which comprises a rectifier incorporating teachings of the present disclosure, in a schematic sketch.

In some embodiments, a rectifier incorporating teachings of the present disclosure comprises a rectifier circuit formed with current valves, in which the current valves are formed with MEMS switches. MEMS switches (MEMS="Micro-Electro-Mechanical Systems") have micromechanically manufactured movable switching elements which are able to be actuated electrically, in particular electrostatically.

In some embodiments, current valves are provided in the form of MEMS switches, while current valves are regularly present in the form of diodes in the prior art. However, with previously known rectifiers, the use of such diodes in the case of mains input voltages of 230 V, for example, results in losses in the mains rectification of the order of approximately 1 percent in relation to the overall device output power. In the case of lower mains voltages, such as the 120 V mains in the US or the 100 V mains in Japan, and the respective tolerances of these mains voltages, the losses of the mains diode rectifiers may reach values of 2% in relation to the overall device output power. With desired efficiencies of at least 95 percent for power supply devices implemented using such rectifiers, these losses in the output power represent a significant challenge. Further, the power losses that have had to be accepted up until now necessitate a high cooling requirement, requiring additional components for heat dissipation. Moreover, the development of heat causes the risk of a premature failure of known rectifiers.

By contrast, rectifiers with current valves in the form of MEMS switches have numerous advantages. MEMS switches have a particularly low contact resistance, resulting in particularly low losses. Consequently, rectifiers and hence also power supply devices having such rectifiers are able to be formed with a particularly high level of efficiency. Moreover, the probability of failure when using MEMS switches as current valves is significantly reduced.

As a consequence of the low losses, complex cooling components can moreover be dispensed with when using MEMS switches, and so the rectifiers described herein can be manufactured particularly cost-effectively. Moreover, the rectifier is able to be designed to be particularly light and compact allowing cooling components to be dispensed with. Power supply devices in particular can thus be designed to be lighter and more compact. Operation at higher ambient temperatures is also realizable on account of the low heat generation.

Expediently, MEMS switches can be driven to switch, that is to say open or close, using almost no power, and so the MEMS switches do not significantly reduce the energy efficiency as a result of being driven. Very short switching times of approximately 2-10 microseconds are achievable using MEMS switches. Thus, switching frequencies of up to 50-60 Hz can easily be obtained using MEMS switches if a period of 8 microseconds is assumed. Moreover, MEMS switches have a low forward voltage and negligible aging, and are also able to be switched off quickly enough by a driving circuit in order to be protected against overcurrents in the event of mains voltage peaks.

In some embodiments, the rectifier comprises connected to the rectifier circuit on the output side a power converter, in particular with active power factor correction, that is to say with an active PFC. In this case, the rectifier circuit can be driven, that is to say switched, using almost no power on account of the current valves designed as MEMS switches.

In the rectifiers described herein, the rectifier circuit may comprise a bridge circuit. In some embodiments, the bridge circuit expediently comprises a Graetz circuit.

In some embodiments, the rectifier circuit can also be a bridgeless rectifier circuit, in particular a bridgeless PFC circuit. Such rectifier circuits concern topologies in which branch(es) of the Graetz circuit are replaced by actively controlled transistors operated at typical operating frequencies of 50-150 kHz. In the process, transistors in the step-up stage can also effect partial mains rectification at the same time, and thus save additional diode losses. Current valves which only have to switch with the mains frequency of 50 or 60 Hz, for example, are used in such topologies. MEMS switches can be used as current valves in these applications in order to further reduce losses.

In some embodiments, the MEMS switches are driven to switch or open. Thus, MEMS switches can regularly be driven by means of an electrostatic control for closing and/or opening the MEMS switch, for example by means of a bending element which is electrostatically deflectable and, as a result of the deflection of the said bending element, moves switching contacts toward one another or separates them.

In some embodiments, the rectifier circuit comprises diodes, in particular semiconductor diodes, suitably connected in parallel with the MEMS switches. By means of such parallel-connected diodes, the MEMS switches can advantageously be protected against a high current flow as a consequence of voltage peaks in a mains voltage. What are known as surge pulses may occur during operation of the MEMS switch and these may be caused, for instance, by a charging current of a capacitor connected to the rectifier on the output side. Since capacitors are typically comparatively low-impedance components, a voltage increase in the mains voltage which exceeds the current voltage of the capacitor may lead to a high current pulse which can amount to around a few 100 A for a period of 10 to 20 microseconds. Electrical contacts of the MEMS switches can easily weld together when faced with such large current pulses.

The resulting currents through the MEMS switches can be effectively limited by means of diodes connected in parallel, since the forward voltage of diodes, for instance in the case of silicon diodes, is no more than 1.5 V even in the case of a forward current of a few 100 A. Consequently, the maximum voltage applied to the MEMS switches can be limited. The limited voltage across the MEMS switches and the internal resistance of the MEMS switches therefore result in an effectively limited forward current through the MEMS switches. A passive limitation of the forward current is also advantageously possible without a significant time delay. This is particularly relevant in the case of surge pulses in particular, in which a current flow can increase within a few microseconds.

In some embodiments, the diodes are oriented and connected in such a way that the diodes form a rectifier circuit, e.g. a bridge circuit and in particular a Graetz circuit, with remaining parts of the rectifier when the MEMS switches are open. The diodes can adopt the function of the MEMS switches in the open position of the latter. In some embodiments, the diodes can adopt the rectification in those phases of operation in which an operation of the MEMS switches for rectification proves to be critical. During most of the operating time, by contrast, the MEMS switches can adopt the rectification, and so the efficiency of the rectification by means of the rectifier according to the invention is significantly increased and fail-safe operation of the rectifier is possible at the same time.

In some embodiments, the rectifier comprises a switching controller, the switching controller being designed to drive the MEMS switches to switch and open. The switching controller may be designed to switch the MEMS switches at the frequency of an AC voltage to be rectified using the rectifier such that the MEMS switches can change switching positions at the frequency of the voltage to be rectified. By controlling the MEMS switches, a rectification can easily be accomplished by suitable switching of the MEMS switches.

In some embodiments, the switching controller is designed to open the MEMS switches in the region of the zero crossing of the mains voltage. In industrial power grids in particular, power electronics have a retroactive effect on the mains voltage and cause the mains voltage to deviate from a sinusoidal curve. In extreme cases, distortion can make it difficult to accurately determine the zero crossing of the mains voltage, increasing the risk of an incorrect activation of the MEMS switches and consequently of an electrical short circuit. However, a high short circuit current through the MEMS switches could easily damage them. By means of the switching controller, the MEMS switches can be opened at voltage values which are too close to a zero voltage, that is to say a vanishing mains voltage, and the failure safety of the rectifier according to the invention can thus be increased.

In some embodiments, the switching controller is designed to open the MEMS switches when a voltage feeding the rectifier, in particular an AC voltage, falls below a minimum distance from a zero voltage. In this way, the MEMS switches can be opened at voltage values close to a vanishing mains voltage, and so the failure safety of the power supply device is further increased. Since the instantaneous value of the current is also very low in the regions of very low mains voltage—especially when using active harmonics limitation (PFC), in which current and voltage are in phase—the increased power loss in the rectifier due to the switching off of the MEMS switches and the higher voltage drop as a result of the semiconductor diodes is negligible.

In some embodiments, the switching controller is designed to open the MEMS switches when a voltage feeding the rectifier, in particular an AC voltage, exceeds a threshold value for a harmonic component. A high harmonic component and a resulting deviation from a sinusoidal mains voltage curve makes a timely prediction of a zero crossing of the mains voltage difficult, and therefore increases the risk of switching the MEMS switches incorrectly and consequently causing a short circuit. This risk is effectively reduced by means of this development, in which the MEMS switches are opened at a certain harmonic component. Consequently, the failure safety and the operational reliability of the power supply device are significantly increased.

In some embodiments, the switching controller comprises one or more detection means for detecting a voltage value of the mains voltage and/or a time profile of the mains voltage. The switching controller may comprise a harmonic component determination device, which determines a harmonic component of the mains voltage on the basis of a voltage value or a time profile. In some embodiments, the switching controller comprises one or more current detection means, which is/are designed to detect a current through one or more or all of the MEMS switches and/or optionally parallel-connected diode rectifiers.

In some embodiments, the switching controller is designed to open the MEMS switches when a forward current flowing through one or more or all of the MEMS switches exceeds a threshold value for the forward current.

In some embodiments, a power supply device comprises a rectifier as described above. In some embodiments, a system comprises a terminal device and a power supply device as described herein, the terminal device being connectable to the power supply device in order to supply power to the terminal device.

The system incorporating teachings of the present disclosure shown in FIG. 1 comprises an automation system 10 and comprises a terminal device in the form of a controller 20 and a power supply device 30. The controller 20 is supplied with a DC voltage, required by the said controller 20 for operation, by means of the power supply device 30.

The power supply device 30 is supplied with an AC voltage by means of an AC voltage connection 40. The power supply device 30 comprises a rectifier 50 incorporating teachings of the present disclosure, which converts the AC voltage into a DC voltage. The rectifier 50 is controlled by a switching controller 60. The structure of the rectifier 50 and the functionality of the switching controller 60 are explained in more detail below. In an optionally implemented converter 55, the mains voltage, which has been rectified and possibly brought to a higher voltage level in the active PFC, is converted into a—usually lower—output voltage.

Figure 2:
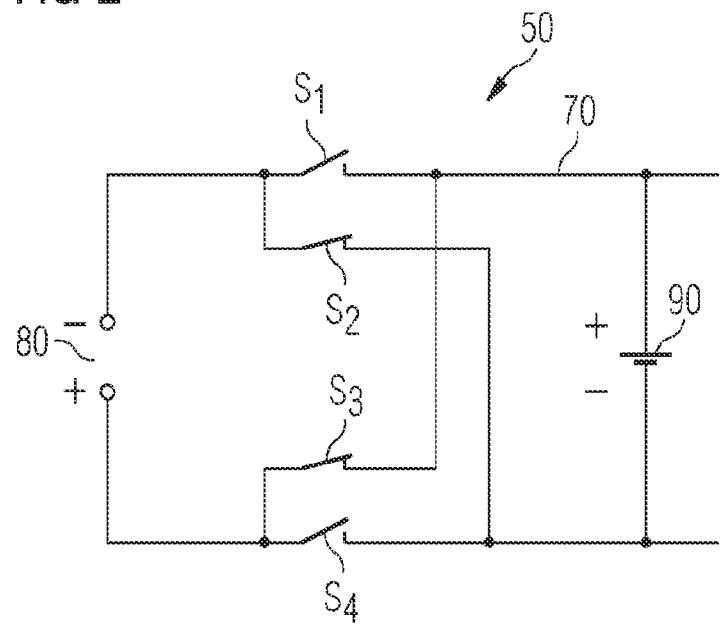
FIG. 2 schematically shows the rectifier according to FIG. 1 in a first switching position in a circuit diagram.
Figure 3:
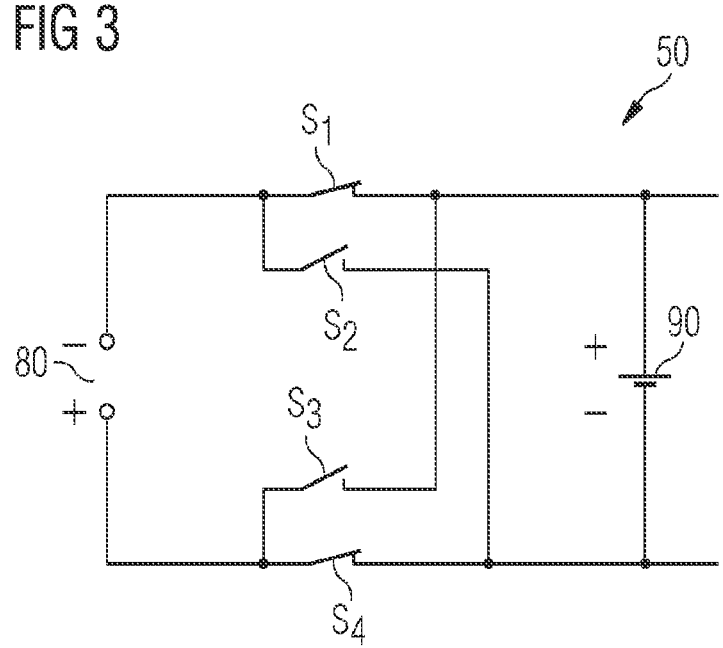
FIG. 3 schematically shows the rectifier according to FIG. 2 in a second switching position in a circuit diagram.
Figure 4:
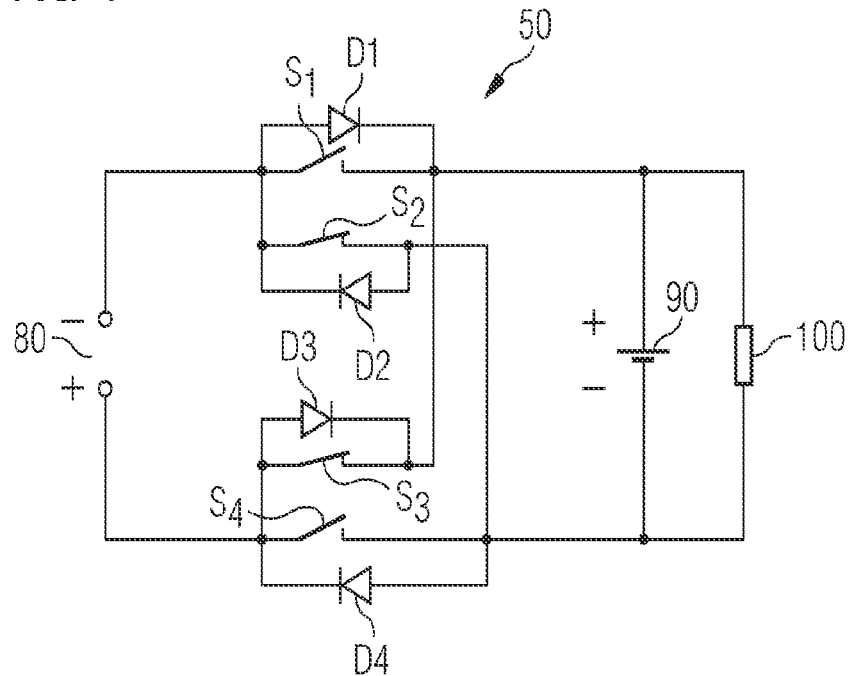
FIG. 4 schematically shows a further exemplary embodiment of a rectifier according to FIG. 1 in a first switching position in a circuit diagram.
Figure 5:
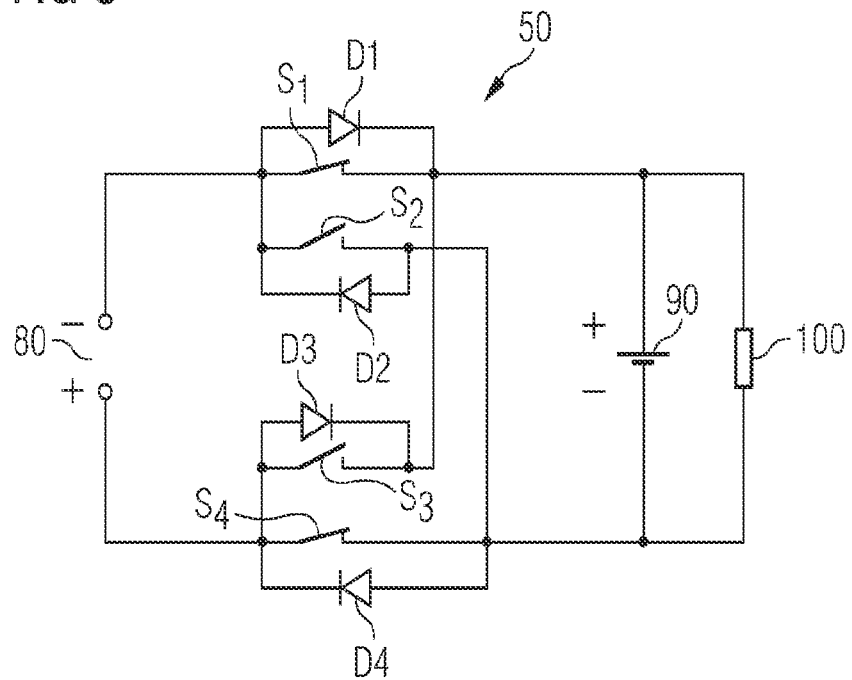
FIG. 5 schematically shows the rectifier according to FIG. 4 in a second switching position in a circuit diagram.

A first exemplary embodiment of the rectifier 50 is described on the basis of FIGS. 2 and 3. The rectifier 50 comprises a Graetz circuit which contains four current valves and which converts an AC voltage 80 fed in at the AC voltage connection 40 into a DC voltage, which charges a capacitor 90 of the rectifier 50. The capacitor 90 forms a DC-link capacitor of the rectifier 50.

In some embodiments, the four current valves of the Graetz circuit are present as MEMS switches $S_1$, $S_2$, $S_3$, $S_4$, which, in the illustrated embodiment, are produced and designed as described in the publication DE 102017215236 A1 "MEMS-Schalter and Verfahren zur Herstellung eines MEMS-Schalters" [MEMS switch and method for producing a MEMS switch]. In terms of its circuit topology, the Graetz circuit corresponds to known Graetz circuits which are formed with diodes as current valves. By way of example, such Graetz circuits are described, for example, at the URL en.wikibooks.org/wiki/Electronics_Fundamentals/Diode_Circuit.

The MEMS switches $S_1$, $S_2$, $S_3$, $S_4$ are connected by means of electrical line connections 70 to form the Graetz circuit. The Graetz circuit routes a positive voltage of the AC voltage 80, fed in below at that instant (in the illustration in FIG. 2), to an upper electrode of the capacitor 90 when the MEMS switches $S_2$ and $S_3$ are closed and the MEMS switches $S_1$ and $S_4$ are open. Accordingly, the negative voltage of the AC voltage 80 that is fed in at the top at that instant is routed to a lower electrode of the capacitor 90. In the switching position of FIG. 3, by contrast, the MEMS switches $S_1$ and $S_4$ are closed and the MEMS switches $S_2$ and $S_3$ are open in the Graetz circuit of the rectifier 50, and so a positive instantaneous voltage of the AC voltage 80 fed in at the top is routed to the upper electrode of the capacitor 90 and a negative instantaneous voltage of the AC voltage 80 fed in below is routed to the lower electrode of the capacitor 90.

Consequently, in the rectifier 50, there is a positive voltage at the top electrode of the capacitor 90 and a negative voltage at the bottom electrode of the capacitor 90 whenever the MEMS switches $S_1$ and $S_4$ and also $S_2$ and $S_3$ are respectively switched from an open switch position to a closed switch position or switched from a closed switch position to an open switch position at a zero crossing of the AC voltage 80. In such an operation, the switching positions of FIGS. 2 and 3 consequently alternate with one another at the frequency of the AC voltage 80, and the capacitor 90 is charged by means of a DC voltage accordingly applied thereto.

The MEMS switches $S_1$, $S_2$, $S_3$, $S_4$ are driven by the switching controller 60 in the manner described, with the result that the MEMS switches $S_1$, $S_2$, $S_3$, $S_4$ operate as current valves and replace the current valves formed with diodes that are used in the prior art.

In a second exemplary embodiment, the rectifier 50 has the same structure as the rectifier 50 shown in FIGS. 2 and 3. The rectifier 50 of this second exemplary embodiment has additional protective diodes $D_1$, $D_2$, $D_3$, $D_4$, which are each connected in parallel with one of the MEMS switches $S_1$, $S_2$, $S_3$, $S_4$. In this case, the protective diodes $D_1$, $D_2$, $D_3$, $D_4$ are connected and oriented in parallel with the MEMS switches $S_1$, $S_2$, $S_3$, $S_4$ precisely so that the protective diodes $D_1$, $D_2$, $D_3$, $D_4$ replace the current valve function of the driven MEMS switches $S_1$, $S_2$, $S_3$, $S_4$ when the MEMS switches $S_1$, $S_2$, $S_3$, $S_4$ are in an open position. Possible damage to the MEMS switches $S_1$, $S_2$, $S_3$, $S_4$ due to voltage peaks can be avoided in this way. In principle, voltage peaks such as so-called surge pulses, in particular, can occur in the rectifier 50. Such voltage peaks represent a voltage rise in the AC voltage which goes beyond the current voltage of the capacitor 90. Due to the low ohmic resistance of the capacitor 90, such voltage peaks can result in a very high current pulse through the MEMS switches $S_1$, $S_2$, $S_3$, $S_4$. Such high current pulses can result in switching contacts of the MEMS switches $S_1$, $S_2$, $S_3$, $S_4$ being welded together. The protective diodes $D_1$, $D_2$, $D_3$, $D_4$, by contrast, have comparatively low forward voltages of a few volts even in the case of large currents.

In the illustrated exemplary embodiment, the protective diodes $D_1$, $D_2$, $D_3$, $D_4$ are formed with silicon diodes, which have forward voltages of no more than 1.5 V, even at currents of a few 100 A. Thus, as a result of the protective diodes $D_1$, $D_2$, $D_3$, $D_4$, the maximum voltage applied to the respective MEMS switches $S_1$, $S_2$, $S_3$, $S_4$ is limited to no more than 1.5 V. Consequently, the maximum respective current flowing through the MEMS switches $S_1$, $S_2$, $S_3$, $S_4$ is limited as a result of the fixed internal resistance 100 of the said MEMS switches $S_1$, $S_2$, $S_3$, $S_4$. Therefore, the protective diodes $D_1$, $D_2$, $D_3$, $D_4$ effectively preclude a welding together of switching contacts of the MEMS switches $S_1$, $S_2$, $S_3$, $S_4$. Since MEMS switches—in contrast to diodes—allow a current flow in both directions, a diode or a controlled switch with diode-like behavior is used for operational reasons when active harmonic limitation with sinusoidal mains current by means of PFC (shown as optional unit 65) is used such that, at times when the voltage of the capacitor 90 is higher than the instantaneous value of the mains voltage, no current can flow out of the capacitors and back into the mains.

The switching controller 60 operates according to the switching method illustrated in FIG. 6. The curve ISSPAV of the instantaneous AC voltage 80 over time t is continuously measured by means of a voltmeter of the switching controller 60, the voltmeter not being expressly shown in the drawing.

To avoid arcing as a result of discharging inductances, the MEMS switches $S_1$, $S_2$, $S_3$, $S_4$ are switched off depending on the detected AC voltage. To do this, the MEMS switches $S_1$, $S_2$, $S_3$, $S_4$ are switched off before the AC voltage 80 reaches an expected zero point. Then, the rectification is carried out by means of the protective diodes $D_1$, $D_2$, $D_3$, $D_4$, resulting in only small losses.

To this end, threshold values THRESH1, THRESH2 are defined and form a voltage range about a zero voltage N, which range is symmetrical in the exemplary embodiment shown and within which range the MEMS switches $S_1$, $S_2$, $S_3$, $S_4$ are switched off so that the rectification at voltages within this voltage range is only carried out by means of the protective diodes $D_1$, $D_2$, $D_3$, $D_4$. In this way, the MEMS switches $S_1$, $S_2$, $S_3$, $S_4$ are switched off at an instantaneous voltage value of the AC voltage that drops below a safety margin from the expected zero, the safety margin being defined by the threshold values THRESH1, THRESH2. In the exemplary embodiment shown, this corresponding switch-off is achieved by virtue of the switching controller 60 activating the MEMS switches $S_1$, $S_2$, $S_3$, $S_4$ by means of an activation signal MEMSA only when the instantaneous voltage value of the AC voltage 80 is outside the voltage range characterized by the threshold values THRESH1, THRESH2, and by virtue of the said switching controller switching off the activation signal MEMSA once the voltage range is reached.

Not only is the instantaneous voltage curve ISSPAV used in an extension of the exemplary embodiment shown in FIG. 6, but the harmonic component of instantaneous voltage curve ISSPAV is additionally calculated from instantaneous voltage curve ISSPAV. Since the instantaneous voltage profile ISSPAV deviates so significantly from a sinusoidal target voltage profile SOSPAV when there is a sufficiently large harmonic component, there is a non-negligible risk of a zero crossing of the AC voltage 80 occurring earlier than what is expected according to the target voltage profile SOSPAV. In this extension, the MEMS switches $S_1$, $S_2$, $S_3$, $S_4$ are activated by means of an activation signal MEMSA only if, firstly, the instantaneous voltage value of the AC voltage 80 is outside the voltage range characterized by the threshold values THRESH1, THRESH2 and, at the same time, the harmonic component is sufficiently small. In the exemplary embodiment shown, the threshold values THRESH1, THRESH2 are 20 percent and −20 percent of the maximum voltage value of the AC voltage 80.

In the exemplary embodiment shown, the harmonic component is sufficiently small if it does not exceed a limit of at most 30 percent. In other exemplary embodiments, which otherwise correspond to the exemplary embodiment shown, other values for the threshold values THRESH1, THRESH2 and another limit for the harmonic component apply.

What is claimed is:

1. A rectifier comprising:
   a rectifier circuit formed with current valves with micro-electromechanical systems (MEMS) switches; and
   a switching controller driving the MEMS switches to switch and open;
   wherein the switching controller opens the MEMS switches when a voltage feeding the rectifier falls below a minimum distance from a zero voltage.

2. The rectifier as claimed in claim 1, wherein the rectifier circuit comprises a bridge circuit or a bridgeless PFC circuit.

3. The rectifier as claimed in claim 2, wherein the bridge circuit comprises a Graetz circuit.

4. The rectifier as claimed in claim 1, wherein the MEMS switches are driven to switch or open.

5. The rectifier as claimed in claim 1, wherein the rectifier circuit comprises diodes connected in parallel with the MEMS switches.

6. The rectifier as claimed in claim 5, wherein the diodes are oriented and connected in such a way that the diodes form a rectifier circuit with other parts of the rectifier when the MEMS switches are open.

7. The rectifier as claimed in claim 1, wherein the voltage feeding the rectifier comprises an AC voltage.

8. The rectifier as claimed in claim 1, wherein the switching controller opens the MEMS switches when the voltage feeding the rectifier exceeds a threshold value for a harmonic component.

9. A power supply device comprising:
a rectifier with a rectifier circuit formed with current valves with microelectromechanical systems (MEMS) switches; and
a switching controller driving the MEMS switches to switch and open;
wherein the switching controller opens the MEMS switches when a voltage feeding the rectifier falls below a minimum distance from a zero voltage.

10. A system comprising:
a terminal device; and
a power supply device with a rectifier;
wherein the rectifier includes a rectifier circuit formed with current valves with microelectromechanical systems (MEMS) switches, and a switching controller driving the MEMS switches to switch and open;
wherein the switching controller opens the MEMS switches when a voltage feeding the rectifier falls below a minimum distance from a zero voltage;
wherein the terminal device is connectable to the power supply device in order to supply power to the terminal device.

* * * * *